March 13, 1962     P. F. SNELLEN     3,025,461

ELECTRICAL MEASURING AND CONTROL APPARATUS

Filed April 2, 1958

INVENTOR.
PAUL F. SNELLEN

BY Price and Henneveld

ATTORNEYS

United States Patent Office 3,025,461
Patented Mar. 13, 1962

3,025,461
ELECTRICAL MEASURING AND CONTROL APPARATUS
Paul F. Snellen, 1850 Seminole Road, Muskegon, Mich., assignor of one-half to Arnold O. Fredrickson, Muskegon, Mich.
Filed Apr. 2, 1958, Ser. No. 725,973
6 Claims. (Cl. 324—46)

This invention relates to an electrical measuring or control apparatus used for the measurement or control of electrical, but particularly non-electrical parameters.

Electrical control mechanisms and apparatus especially for non-electrical parameters has grown tremendously during the last several years. It is now common place to measure light intensity, pressure, annular and linear velocity, acceleration, sound intensity, elongation, torque, temperature and many other various properties by electronic means. Foremost of the means for making such measurements and detecting various quantities for control purposes, is the use of a variable resistor in an electrical circuit, the variation in the resistance being a function of the value of the quantity being detected. Variable resistances are also used in other types of electrical systems; such as, memory systems. In all of these electrical apparatus, the variation in a resistance is made responsive to a variable condition or variable value of a quantity so that the resistance is a function of such condition or quantity.

Heretofore, changes in resistance have been made by various different means. For example, it is well known to provide a closely wound resistor element on which rides a brush or wiper, the movement of which is responsive to the condition or value to be measured or detected. The resistor element is connected to a conventional bridge so that a part of the resistance on one side of the brush is one arm of a bridge and the resistance of the resistor on the other side of the wiper is another arm of the bridge. By this arrangement, as the brush moves on the resistor the resistance of the arms on the bridge change. This changes the bridge output which is thus a function of the condition causing movement of the brush.

This system is satisfactory for detecting certain conditions; however, when close to infinite resolution is required for detecting minute values, the aberrations inherent in this system make it unsatisfactory and undesirable. Aberrations in a brush-resistor combination are primarily due to the stair step pattern of the measured resistances as the brush is moved across the resistor. In other words, as the brush moves across the resistor element a measurement of the resistance shows a stair step type of pattern rather than a straight linear line. Other causes of aberrations are the contact and frictional resistances between the brush and the resistor element.

An object of this invention is to eliminate these aberrations by providing a novel variable resistor means.

Another object of this invention is to provide an electrical measuring or control apparatus having resistor means, the resistance of which is variable in response to a variable quantity being detected, such apparatus being substantially unaffected by aberrations.

Still another object of this invention is to provide a variable resistance means having substantially infinite resolution.

A further object of this invention is to provide an instrument having a movable element the position of which is indicative of a certain quantity or condition, such element having a resistor means, the resistance of which is responsive to the position of the element, the resistance having a variation of substantially infinite resolution.

Other objects of my invention will become obvious upon reading the following specification in conjunction with the accompanying drawings, wherein.

Figure 1:
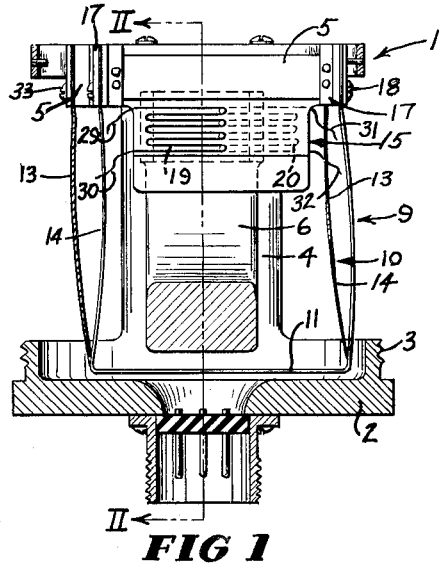
FIG. 1 is a side elevational, sectional view of one instrument for which this invention is adapted.

Briefly this invention relates to an electrical measuring or control apparatus including resistor means the resistance of which is variable in response to a variable quantity or condition being detected. The novel feature of this invention is to provide a resistor means the resistance of which is highly sensitive to changes in magnetic field. A magnetic field is then provided and also means responsive to the value of the variable quantity or condition for controlling the intensity of a magnetic field to which the resistor is subjected. This is accomplished by either varying the strength of the magnetic field or the position of the resistor means with relation to the field. In either case, this intensity of the magnetic field to which the resistor is subjected is a function of the variable quantity or condition and as a result the resistance of the resistor will vary in response to such variable quantity or condition.

Referring to the drawings, reference numeral 1 designates an instrument known as an accelerometer which is illustrative of the type of apparatus for which this invention is adapted. Before describing this accelerometer, it should be understood that this invention is not limited in its broadest aspect to this particular instrument since the broad principle of this invention is applicable to many other types of apparatus, such as, altimeters, temperature indicators, gyroscope controls, memory systems, and any other types of systems and instruments using a variable resistance.

The accelerometer 1 consists of a support base 2 which is somewhat cup-shaped in form and has a threaded flange 3 on which a dust cover (not shown) is adapted to be mounted. Mounted on two sides of the cylindrical support base 2 are the support posts or columns 4 on the top of which are mounted the support brackets 5. These support brackets 5 are arcuate members (FIG. 3) conforming to the shape of the base 2 so as to receive a cylindrical dust cover. The support brackets 5 support a U-shaped permanent magnet 6 having its legs depending from brackets 5 adjacent the support posts 4. The top ends of the legs of magnet 6 have the polar portions or poles 7 extending toward each other forming a flux gap 8 between them.

It should be obvious that this U-shaped permanent magnet is of the conventional type in which magnetic flux flows between the two poles 7 creating a magnetic field in the gap 8. This magnet 6 can be a permanent magnet or an electromagnet, whatever is preferred.

Figure 2:
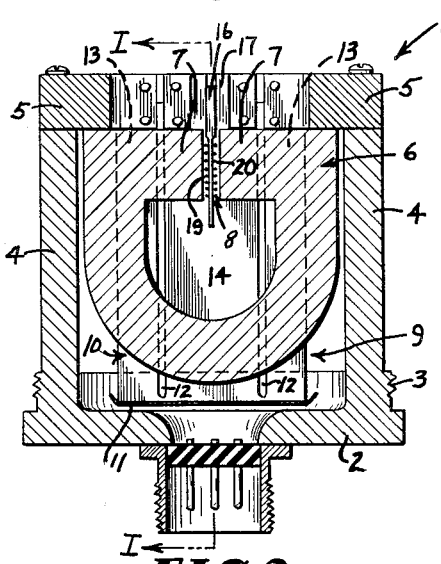
FIG. 2 is a sectional view taken along the plane II—II of FIG. 1.
Figure 3:
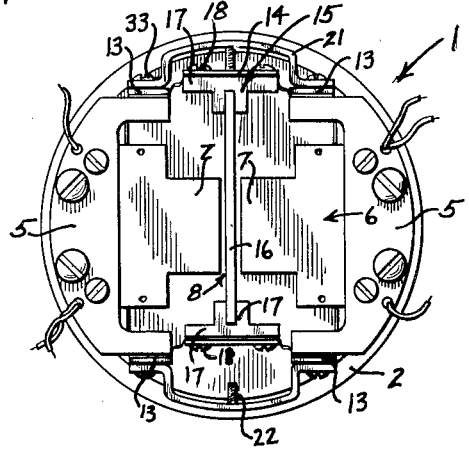
FIG. 3 is a plan view of the instrument of FIGS. 1 and 2.

Also supported on the support bracket 5 is the U-shaped spring element 9 having the depending legs 10 connected by the web 11 at their lower ends. The legs 10 have the elongated slits 12 (FIG. 2) forming the suspension support parts 13 and the central resistor element support parts 14 located between each of the suspension support parts. The spring element 9 is supported by suspension parts 13 on the sides of the support bracket 5 by screws 33 (FIGS. 1 and 3). These legs extend downwardly on each side of the magnet. The resistor element support parts 14 are freely movable between the support brackets 5 and support a variable resistor assembly 15 between them. This assembly includes the armature 16 supported at each end by the armature support brackets 17 which are secured to the spring parts 14 by small screws 18 as shown by FIG. 3.

The armature 16 is an elongated member having grids or resistors 19 and 20 (FIG. 5) secured on opposite faces. These grids are formed by a wire of material the resistance of which is highly sensitive to changes in the strength of a magnetic field. The metal I prefer to use is bismuth which is a very brittle material, of a greyish-white color, which when subjected to different strengths of a magnetic field has different resistances. Bismuth has been used in the so-called "Bismuth Spiral Method" in which method the magnetic flux in an air gap is measured by observing the change in the resistance of a flat spiral bismuth wire, which increases with increased strength of field. Other metals, such as germanium, could be used if available in wire form or any other desirable form. However, to my knowledge, presently such metals are not available and, therefore, the only known metal that can be used is bismuth. This invention, however, should not be limited in its broadest aspect to bismuth since other metals may become available in due time.

Figure 5:
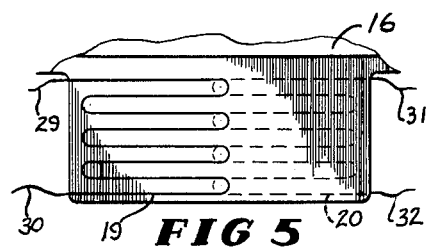
FIG. 5 is a fragmentary view of the movable element of FIGS. 1 and 2.
Figure 6:
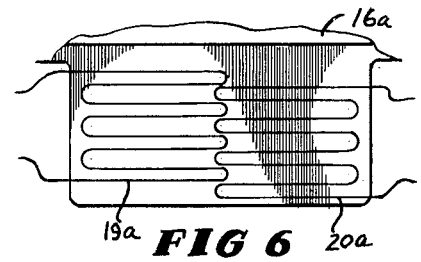
FIG. 6 is a fragmentary view of modified, movable element similar to that of FIG. 5.

The bismuth wire is wound in a non-inductive fashion such as that shown by FIG. 5 where change in the direction of the field does not affect the resistance and no current is induced in the wire due to the induction. The non-inductive arrangement of this wire can be of various forms, for example like that shown in FIG. 6 wherein the grids 19a and 20a are both attached to the same side of the armature 16a. It is preferable that the grids overlap so that at any one time at least a portion of both of the grids are exposed to the magnetic field.

The combined weight of mass of the bracket 17 and armature 16 is chosen in accordance with well-known principles involving accelerometers. The inertia of the mass created by acceleration or deceleration determines the movement of the armature 16 which position is indicative of the acceleration of the body being accelerated. In previous devices of this type a brush connected to the mass contacted a resistor element, the position of the brush determining the resistances in the arms of a bridge. In accordance with this invention the movement of the armature 16 determines the exposure of the two grids 19 and 20 in the magnetic field of gap 8 and thus such movement affects the resistances of these grids.

On each side of the support brackets 5 are the frames 21 having travel adjustment screws 22. These screws 22 limit the extent of the travel of the armature 16.

Figure 4:
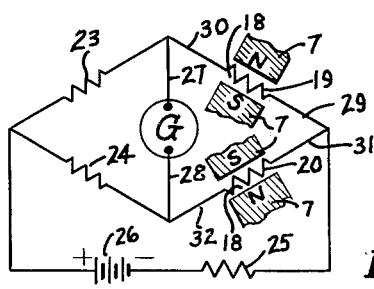
FIG. 4 is an electrical diagram schematically illustrating this invention.

The two grid resistances 19 and 20 having leads 29, 30 and 31, 32 respectively, are connected in a Wheatstone bridge as illustrated by FIG. 4. Each of these grids form the resistance in one of the arms of the bridge. The other arms have fixed resistances 23 and 24. This Wheatstone bridge is of fixed resistor type also having the resistor 25 connected in series with the power supply 26. Connected between the resistances 19, 23 and 20, 24 is a galvanometer "G." This galvanometer indicates an unbalance of the bridge and thus is capable of indicating a movement of the armature 16. It should be understood that rather than a galvanometer "G" the two lead lines 27 and 28 can be connected in a system for controlling a mechanism.

*Operation*

As previously stated, this invention is not limited to an accelerometer instrument. It has application to all types of instruments and to many other uses in the electrical field. However, in order to appreciate and understand the basic concepts of this invention the following is a description of the use of this invention in the accelerometer previously described.

This accelerometer is to be used in the conventional way. It is so arranged that when acceleration or deceleration occurs the resistor assembly 15 moves. This moves one of the grids or resistors 19 or 20 in a direction out of the gap 8 while the other grid or resistance moves further into the gap 8. This changes the exposure of the resistors 19 or 20 to the magnetic field in gap 8 and as a result the strength of the field to which the resistors are subjected is changed. This decreases the resistance of one and increases the other. This variation in the resistances 19 and 20 causes an unbalance of the bridge of FIG. 4 creating a flow of current through the leads 27 and 28. This flow of current can be used to give an indication on the galvanometer, which can be calibrated for acceleration, or it can be used for impressing a signal on a system which is adapted to be responsive to acceleration.

The above description relates entirely to the situation in which a movable element is moved in response to a given value of a quantity or to a certain condition. This invention is not limited entirely to such movable elements since that is not the only manner in which the strength of the magnetic field to which the resistors 19 and 20 are exposed can be accomplished. It is possible within the broadest aspect of this invention to vary the strength of the field in many other ways; for example, by impressing a signal on a coil which creates a field and varying that signal in order to vary the strength of the field. In such a case, the variation of the resistance of a bismuth grid located in the field will be a function of the variation of the current impressed on the coil and creating the field. Such a modification of this invention should be considered to be included under the broadest aspect of this invention.

It should be obvious from the above description that this invention eliminates the aberrations generally encountered in variable resistor type indicating, measuring, and controlling systems. The stair step pattern of resistance variation caused by a voltage divider or potentiometer, that is by a resistor element on which a brush moves, is entirely eliminated by this invention. In fact, the resolution is substantially infinite. The aberrations caused by the contact of a brush with a resistor element and also the frictional resistances inherent in such arrangements are eliminated.

Having described my invention it should become obvious that although I have shown the preferred form, alterations and modifications are possible within its broadest aspect. Therefore, unless the claims by their language expressly state otherwise, such alterations and modifications shall be considered to be covered by this invention.

I claim:

1. A variable resistance device including a movable element responsive to a variable quantity being detected for varying the resistances of a pair of resistor means, the improvement comprising: said resistor means each being a bismuth wire non-inductively arranged, which wire is highly sensitive to the changes in strength of magnetic field; a magnetic field; both of said resistor means being overlapped to expose a portion of each resistor means in at least one position of said movable element to the same portion of said magnetic field; said movable element being movable in response to a variable quantity, whereby as one resistor means enters the field the other resistor means recedes from said field thereby varying the exposure of each of said resistor means to said field thereby varying the resistance of each of said resistor means as a function of said variable quantity.

2. The apparatus of claim 1 in which the movable element is movable in opposite directions normal to the lines of magnetic force of said magnetic field and each wire is arranged in a series of continuous loops located substantially on one plane normal to said force lines and said loops extend in said directions.

3. The apparatus of claim 2 in which the loops are located adjacent each other and ends of said loops of the respective wires overlap each other whereby a portion of both wires are simultaneously exposed to the same portion of said magnetic field.

4. An accelerometer having a magnet including a gap formed between two poles thereof with a magnetic field having lines of force extending in a predetermined direction in said gap between said poles; a movable support element supporting in and adjacent said gap, substantially on a plane normal to said lines of force, a pair of wires each highly sensitive to changes in the intensities of a magnetic field; a spring means having a resistant elastic force directed substantially along said plane for normally holding said support element in a predetermined position within said gap, said spring means being resiliently and elastically deformable by a force on said support member in a direction only along said plane in response to acceleration or deceleration whereby the exposure of said wires to said magnetic field is varied to vary the respective resistances of the wires for measuring said acceleration or deceleration.

5. The apparatus of claim 4 in which the movable support element is movable in opposite directions normal to the lines of magnetic force of said magnetic field and each wire is arranged in a series of continuous loops located substantially on said plane normal to said force lines and said loops extend in said directions.

6. An accelerometer having a magnet with a gap having a magnetic field; a movable element movable in opposite directions normal to the lines of magnetic force of said magnetic field; said movable element being resiliently mounted in said gap the movement of which is a function of acceleration or deceleration; a pair of wires each highly sensitive to changes in the intensities of a magnetic field, said wires being mounted on said movable element and non-inductively arranged with respect to each other and portions of each wire being arranged to be substantially non-inductive; each of said wires being arranged in a series of continuous loops located substantially on one plane normal to said force line with said loops extending in said opposite directions; said loops being located adjacent each other and the ends of said loops of the respective wires overlapping each other whereby a portion of both wires are simultaneously exposed to the same portion of said magnetic field; said movable element being movable in response to acceleration or deceleration to vary the exposure of said wires in said magnetic field thereby varying the resistance of said wires in response to acceleration or deceleration; said wires being connected in an electrical circuit to control the same.

References Cited in the file of this patent

UNITED STATES PATENTS

| | | |
|---|---|---|
| 2,226,847 | Clark | Dec. 31, 1940 |
| 2,335,117 | Harrison | Nov. 23, 1943 |
| 2,599,550 | Fraser | June 10, 1952 |
| 2,649,569 | Pearson | Aug. 18, 1953 |
| 2,659,043 | Taylor | Nov. 10, 1953 |
| 2,828,396 | Forman et al. | Mar. 25, 1958 |